United States Patent
Kaba

(10) Patent No.: US 6,585,463 B1
(45) Date of Patent: Jul. 1, 2003

(54) MILLING APPARATUS

(75) Inventor: Michael C. Kaba, Rocky Hill, CT (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 10/154,665

(22) Filed: May 23, 2002

(51) Int. Cl.[7] .......................... B23D 5/02; B23D 37/00; B23B 39/00
(52) U.S. Cl. .......................... 409/305; 409/259; 408/90
(58) Field of Search ................... 409/305, 259; 408/90

(56) References Cited

U.S. PATENT DOCUMENTS

| | | | | |
|---|---|---|---|---|
| 3,232,141 A | * | 2/1966 | Swanson et al. | 408/90 |
| 4,072,439 A | * | 2/1978 | Diggs | 408/90 |
| 5,236,292 A | * | 8/1993 | Loucks, Jr. | 409/218 |
| 5,413,440 A | * | 5/1995 | Willson et al. | 409/235 |
| 5,544,988 A | * | 8/1996 | Liu | 408/90 |
| 6,457,919 B1 | * | 10/2002 | Sangster | 409/202 |

* cited by examiner

Primary Examiner—A. L. Wellington
Assistant Examiner—Dana Ross
(74) Attorney, Agent, or Firm—Fay, Sharpe, Fagan, Minnich & McKee

(57) ABSTRACT

Apparatus for machining a groove in an arcuate workpiece segment comprises a horizontal milling table, a carriage mounted on the table and supporting a workpiece to be machined, a milling guide mounted on the carriage and including a vertical post, an arm extending radially from the post, and a milling assembly attached to the arm and including a cutting tool overlying a workpiece mounted on the carriage. The table is movable in x and y directions in a horizontal plane to displace the workpiece along an arcuate path relative to the cutting tool, and the milling assembly is displaceable along a vertical axis to move the cutting tool toward and away from the workpiece.

36 Claims, 14 Drawing Sheets

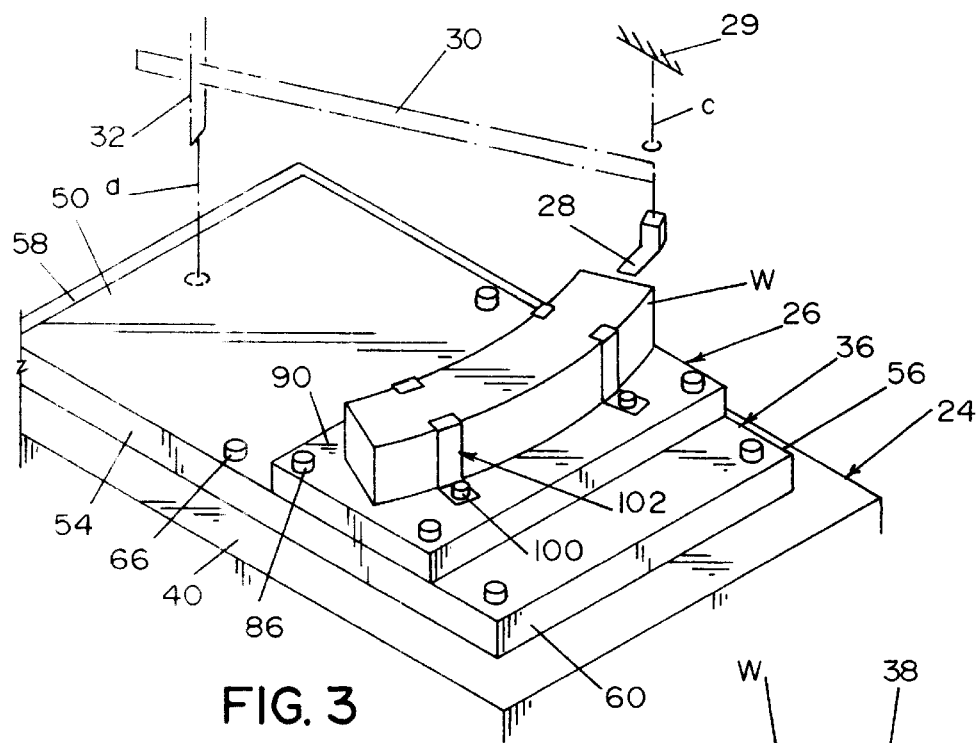
FIG. 3
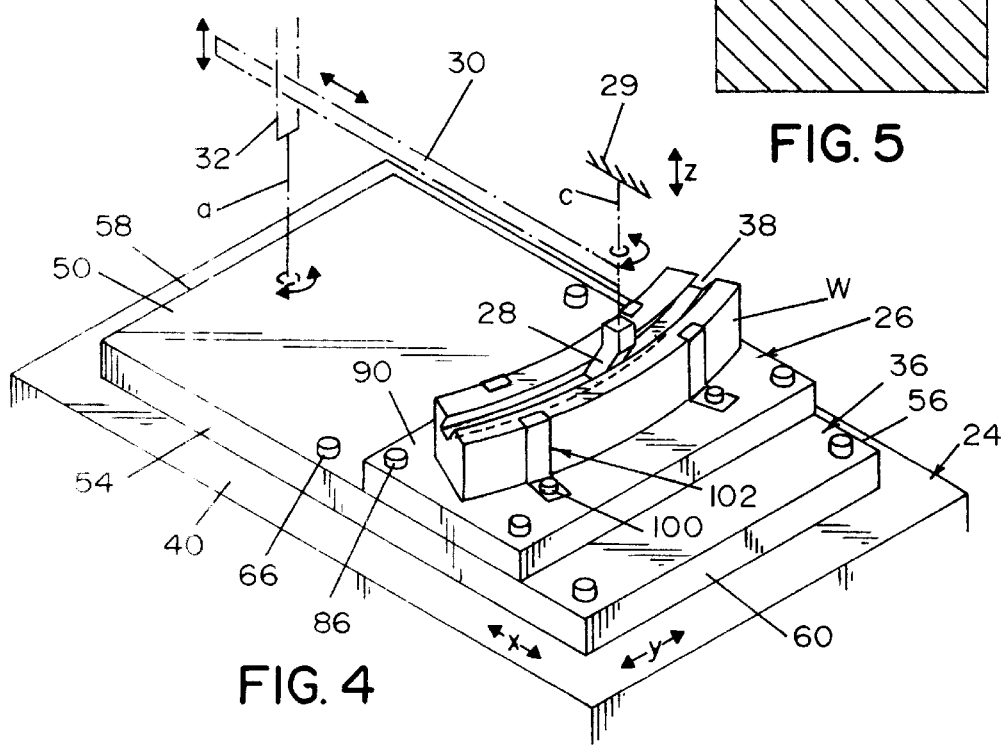
FIG. 5
FIG. 4

FIG. 7

MILLING APPARATUS

BACKGROUND OF THE INVENTION

The present invention relates to the art of machining workpieces by stock removal and, more particularly, to improvements in a milling apparatus for producing radial geometries.

Radial grooves are used, for example, in the manufacture and assembly of aircraft turbine engines. More particularly in this respect, turbine engines generally have a series of round rings comprised of a group of radial segments that are held in the ring configuration by hooks utilizing radial grooves machined into the segments. Machining of the radial grooves presents a manufacturing challenge due to the tough and expensive alloys that are used in the aircraft industry, as well as the close tolerances required for associated components.

Conventional methods of producing the radial grooves typically require a fixture that holds a quantity of workpiece segments in a ring configuration. The assembly of the workpiece segments must duplicate the diameter that the parts create, for example, in the assembled turbine engine. The current machining method utilizes a conventional vertical turret lathe to machine the radial grooves once all of the workpiece segments are located in the ring configuration. Vertical turret lathes incorporate a cutting tool in a vertical spindle having a fixed axis of rotation, and the workpieces are mounted on a table or base which is rotated relative to the cutting tool for machining of the workpieces by the stationary cutting tool. The disadvantages of using a vertical turret lathe include high fixture costs and the risk of damaging an entire set of parts if the operator and/or lathe makes a dimensional error. Additionally, vertical turret lathes are a less rigid style of milling apparatus, and are limited due to the machine tool spindle accommodating only one cutting tool. Consequently, there remains a need for a milling apparatus for producing radial geometry which overcomes the aforementioned problems and limitations.

SUMMARY OF THE INVENTION

In accordance with the present invention, an improved apparatus for the machining of workpieces by stock removal is provided by which the foregoing and other disadvantages and problems with lathes and millers heretofore available are overcome orminimized. More particularly in accordance with the present invention, apparatus is provided which has a radial motion capability combined with machine feed rates and variable speed to create a shaping action that produces grooves of varying radii and radial geometry in segment shaped workpieces. The present invention includes a machine base equipped with a milling table, a workpiece holding fixture, a milling assembly, and a milling guide. The milling guide, in accordance with the invention, establishes a point of rotation for the milling assembly. The milling table includes a carriage mounted thereon with a series of locating or clamping holes machined into its upper surface starting a few inches from the point of rotation of the milling guide and extending outward which allows progressively larger radii to be created depending on the location of the workpiece holding fixture relative to the point of rotation. In one embodiment, the milling table is movable in x and y axes within a horizontal plane. The workpiece holding fixture mounts the segment shaped workpiece to the carriage. As a result of the simplified workpiece fixture, the mounting and machining steps reduce the process time of a workpiece between its introduction to the workpiece fixture and its completion in the finished state. The milling guide is mounted on the milling table and is pivotal about and vertically adjustable along a z axis orthogonal to the horizontal machining plane. The milling guide includes a radial arm which is connected to the milling assembly. The milling assembly includes a base unit for securing the tool holding member which secures the cutting tool. The dimensions of the cutting tool and the vertical feed of the milling assembly, control the width and depth of the groove, respectively. The cutting tool can also be adjusted by means of rotating the base unit of the milling assembly for radial location to produce exact radii in parts that are being shaped to a specific print requirement. The milling assembly and the milling table are independently supported. A control device such as a computer numerically controlled (CNC) controller is used for coordinating the movements of the milling table and the milling assembly to machine a radial groove in the workpiece.

In contrast to the known state of the art, each workpiece segment is machined independently which reduces the time and expense for the fixture arrangement, and also eliminates the risk of damaging an entire set of parts if there is a dimensional or operator error. It will be appreciated that the invention can facilitate a machining cell created to take advantage of a one workpiece flow system.

The workpiece fixture clamps the workpiece to the carriage. A radial arm connects the milling assembly to the milling guide. The milling guide's pivotal axis is positioned at a preset location relative to the workpiece which is fixedly attached to the carriage by the fixture arrangement. The cutting tool or tools are secured to the milling assembly's base unit which has an independent axis of rotation. The milling guide's pivotal axis is parallel to the vertical axis of the milling assembly. The milling assembly also moves vertically up and down along its axis orthogonal to the milling table and is controlled at a predetermined feed rate to produce a chip load based on the material being shaped. The milling assembly controls the depth of the groove by moving up and down along its vertical axis. The complexity of the apparatus required for performing and controlling geometric machining is thus reduced or minimized.

In one embodiment, a single cutting tool is used for shaping a radial conical groove. In this embodiment, the milling table moves in the programmed arc along the x axis using the y axis motion to generate the arc. The cutting tool is secured to the base unit of the milling assembly by means of the tool holding member and moves up and down along the z axis to control the chip load per pass and the depth of the groove. The milling table also moves along the y axis in a programmed motion to maintain proper alignment with the milling assembly in order to form a conical shaped groove. In this embodiment, the radial arm is radially displaceable relative to its axis of rotation which allows movement of the milling guide along the x axis in a horizontal plane parallel to but noncoplanar with the milling table. Additionally, the radial arm is axially displaceable relative to the post which allows the radial arm to maintain contact with the milling guide as the milling assembly moves up and down along the z axis.

In another embodiment, multiple or ganged cutting tools can be used when shaping a straight sided radial groove. The milling table moves in a programmed arc in a horizontal plane, and the ganged cutting tools are secured in the base unit of the milling assembly and move up and down along the vertical z axis to control the chip load per pass and the depth of the groove. In this embodiment, the radial arm is radially fixed relative to its axis of rotation while a section of the milling assembly moves relative to the arm along a horizontal x axis.

It is accordingly an outstanding object of the present invention to provide improvements in connection with milling apparatus which produces a radial milling motion through the use of a milling guide and a radial arm.

A further object is the provision of milling apparatus which provides a radial motion of the cutting tool combined with machine feed rates and variable speeds to create a shaping action that produces arcuate grooves of varying radii in workpieces depending on the adjustments of the machine components.

Another object is the provision of milling apparatus of the foregoing character wherein a single cutting tool is used for shaping a conical radial groove, and multiple cutting tools can be used for shaping straight-sided radial grooves.

Still a further object of the invention to provide apparatus of the kind mentioned above which produces high machining precision while minimizing the complexity of the apparatus required for performing and controlling workpiece machining.

Yet another object is the provision of milling apparatus of the foregoing character which is efficient in use and promotes a more economical machining of grooves than heretofore possible.

Yet another object is the provision of milling apparatus that allows use of current milling apparatus tables with little modification.

BRIEF DESCRIPTION OF THE DRAWINGS

The foregoing and other objects and advantages will in part be obvious and in part pointed out in the following description taken together with the accompanying drawings in which:

FIG. 3 is a pictorial diagram of milling apparatus illustrating a preferred embodiment in accordance with the invention;

FIG. 4 is a pictorial diagram of the milling apparatus shown in FIG. 4 and illustrating a cutting tool engaged with the workpiece to provide a conical groove therein;

FIG. 5 is an enlarged cross-sectional elevation view of the workpiece in FIGS. 3 and showing a conical groove machined in the workpiece;

FIG. 7 is a side elevation view of the milling apparatus looking from left to right in FIG. 6;

DESCRIPTION OF PREFERRED EMBODIMENTS OF THE INVENTION

Figure 1:
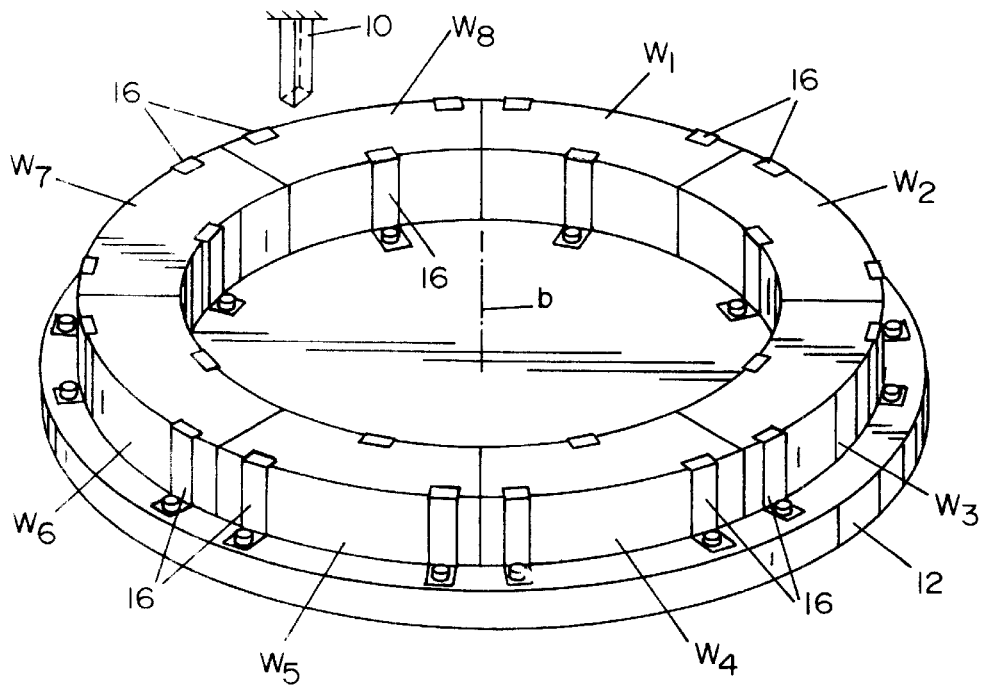
FIG. 1 is a pictorial diagram of several workpieces mounted to a turret lathe shaping fixture representing the prior art.
Figure 2:
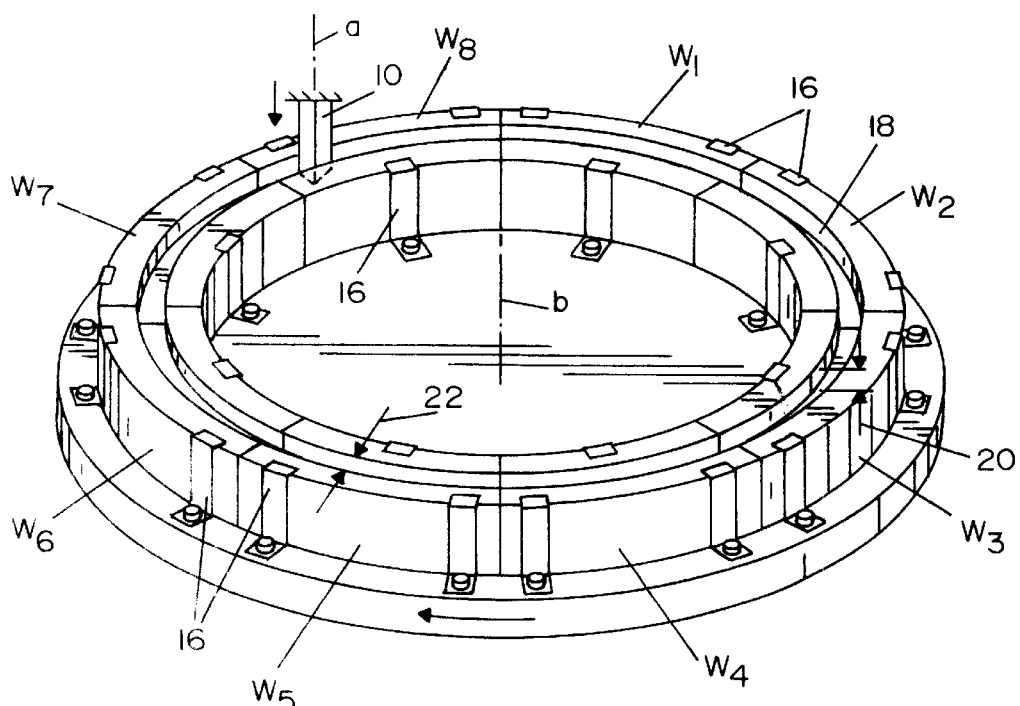
FIG. 2 is a pictorial diagram of the assembly of workpieces in FIG. 1 and showing the cutting of a groove therein.

Referring now in greater detail to the drawings, wherein the showings are for the purpose of illustrating preferred embodiments of the invention only, and not for the purpose of limiting the invention, as partially illustrated in FIGS. 1 and 2 the existing prior art utilizes a vertical turret lathe with a vertically-oriented spindle including a tool attachment, not shown, whereby a cutting tool 10 is mounted and movable up and down along a vertical axis a. As shown in FIGS. 1 and 2, a plurality of workpieces $W_1$–$W_8$ are mounted by corresponding workpiece holders 16 in a circular configuration on a rotatable milling table 12. Milling table 12 and the affixed workpieces rotate about axis b. As the workpieces are rotated about the vertical spindle axis b, cutting tool 10 moves downward along axis a to engage the workpieces. The depth 20 of the resulting groove 18 which is milled into the workpieces, as shown in FIG. 2, is controlled by the vertical displacement of cutting tool 10. The width 22 of the machined groove 18 is controlled by the width of the cutting tool 10. It will be appreciated that fixtures 16 are costly, and that it is time consuming to properly align and mount the workpieces on table 12. In addition, as the cutting tool 10 engages the workpieces, the groove contour and concentricity relative to axis b are subject to error if the operator has not properly mounted the workpieces and/or the machine deviates from specifications.

Two embodiments of the present invention will now be described with reference to the accompanying drawings. Throughout the following descriptions, reference will be made to directions up, down, top, bottom, left, right, front, and back, and should be interpreted as seen by an operator standing at the front of and facing the described milling apparatus. With the operator in the aforementioned position, the x axis direction is left to right, the y axis direction is toward and away, from the plane of the drawing sheet, and the z axis direction is up and down.

FIGS. 3–5 pictorially illustrate one embodiment of the invention, the details of which will be more fully described hereinafter. As shown, a single arcuate, segmental workpiece W is mounted on a milling table 24 by a workpiece holding fixture 26. The milling table 24 is movable along both x and y axes in a horizontal plane. A cutting tool 28 is secured to a milling assembly, as described hereinafter, and the milling assembly, which is supported from above as indicated by the numeral 29, is connected to a radial arm 30. The radial arm is guided by a milling guide 32. Arm 30 and the milling assembly are pivotal with milling guide 32 about axis d, as set forth hereinafter, and arm 30 and the milling table move along an arcuate path. Milling guide 32 is pivotal about axis d on a carriage 36 mounted upon milling table 24. Arm 30 maintains a radial relationship between cutting tool 28 and workpiece W whereby a conical groove 38, as shown in FIG. 5, can be machined in an arc along the workpiece W. FIG. 4 shows the relationship between radial arm 30 and the workpiece W during the machining operation. The milling assembly and the radial arm are movable up and down along a vertical z axis orthogonal to the x and y axes. The movements of workpiece W in the x and y directions during the machining of a workpiece are achieved by moving milling table 24. In this respect, the milling table is connected to a machine base, not shown, which includes a series of lead screws, motors, and belts, as is common in the industry for coordinating the directional movements of a milling table, and which can be controlled to produce the desired arcuate motion of milling table 24.

As shown in FIGS. 6–10, the milling table 24 includes an upper surface 40, opposite front and back sides 42 and 44, respectively, and opposite left and right sides 46 and 48, respectively. Carriage 36 is mounted upon upper surface 40 of milling table 24 and includes an upper surface 50 and a lower surface 52, opposite front and back sides 54 and 56, respectively, and opposite left and right sides 58 and 60, respectively. Carriage 36 supports milling guide 32 as set forth more fully hereinafter. A plurality of mounting holes 64 are provided through the carriage, and the carriage is attached to milling table 24 by bolts 66 that extend through mounting holes 64 and into corresponding threaded openings 68 in milling table 24. Accordingly, the carriage moves in conjunction with the movements of milling table 24. Carriage 36 also includes two rows of linearly arranged locating and/or clamping holes 80 which are internally threaded and extend into the upper surface 50 of the carriage starting a few inches from collar 120 and extending outward to a location near the right side 60 of the carriage. The movements of carriage 36 and milling table 24 are shown by arrows x and y in FIG. 6.

Figure 6:
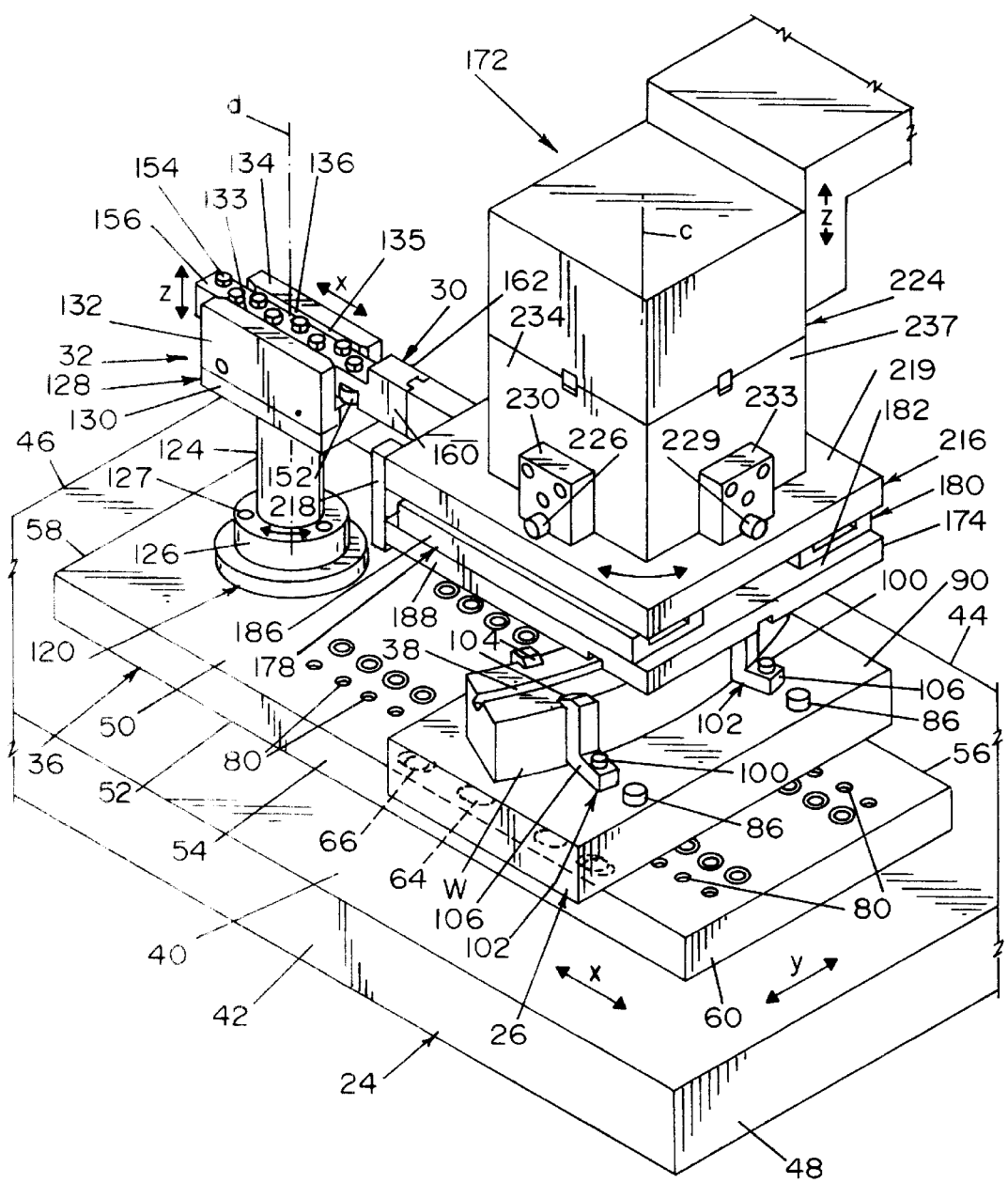
FIG. 6 is a perspective view of the milling apparatus.
Figure 7:
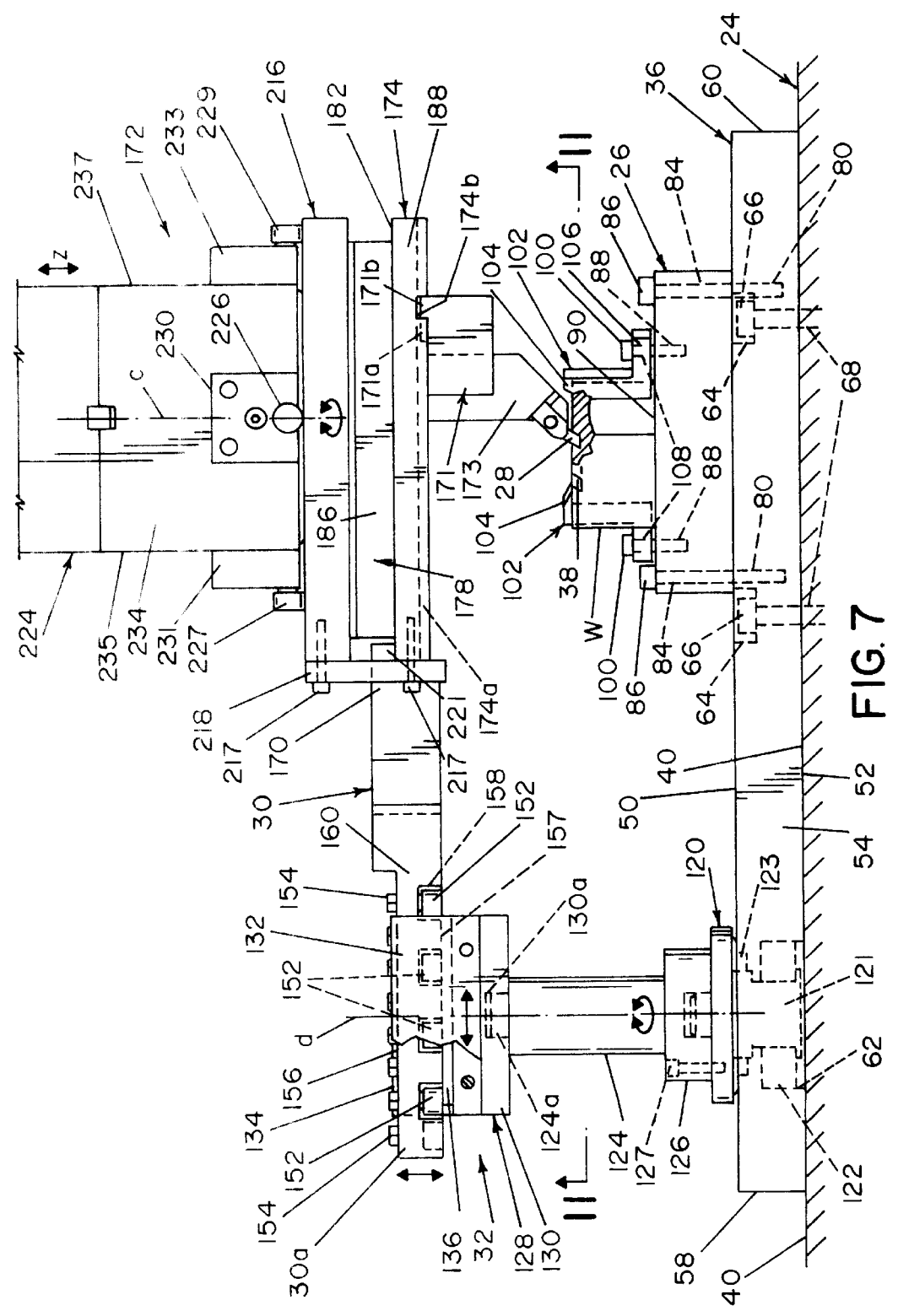

Workpiece holding fixture 26 is adjustably mounted on upper surface 50 of carriage 36. In this respect, as best seen in FIGS. 6 and 7, the workpiece fixture includes holes 84 which extend therethrough and receive hex bolts 86 threadedly interengaged with holes 80 in carriage 36 to secure the workpiece holding fixture to the carriage. The series of holes 80 provide for the position of the workpiece holding fixture to be adjusted either closer to or further from axis d of milling guide 32 for varying the radii of curvature of grooves cut in a workpiece, as will be more fully described hereinafter. As seen in FIGS. 6–10, workpiece fixture 26 also includes a plurality of internally threaded holes 88 in upper surface 90 of the fixture for receiving mounting bolts 100 which are used to secure Z-shaped workpiece clamps or mounts 102 to workpiece fixture 26. Mounts 102, as shown, have an inwardly extending securing lip 104 at the upper end thereof and an outwardly extending base leg 106 at the lower end thereof which includes a hole 108 therethrough for receiving mounting bolts 100. The mounts impose a downward force on workpiece W as base legs 106 of the mounts are displaced toward the workpiece fixture by means of bolts 100.

Milling guide 32 includes a collar 120 adjacent top surface 50 of carriage 36 and a shaft portion 121 depending therefrom into an opening 62 in the carriage. A bearing 122 surrounds shaft 121 and supports collar 120 and thus milling guide 32 for rotation about axis d. A post 124 is affixed to collar 120 for rotation therewith by a flange 126 on the post and a plurality of bolts 127 extending through flange 126 and into threaded bores provided therefor in collar 120. Connected to the upper end 124a of post 124 distal to the carriage 36 is a radial arm cradle 128. Cradle 128 includes a horizontal bottom support 130 having an opening 130a in the underside thereof which receives upper end 124a of post 124, whereby cradle 128 is pivotal about axis d relative to carriage 36. Cradle 128 further includes sides 132 and 134 spaced apart to form an opening 136 therebetween. Bottom support 130 and opening 136 provide space for receiving end 30a of arm 30, and the arm is supported in the cradle for horizontal and vertical movement between sides 132 and 134, respectively, in the x and z directions. Partially in this respect, a plurality of rollers 152 are mounted on end 30a of radial arm 30 by corresponding bolts 154. Bolts 154 extend downwardly through the top side 156 of the radial arm and provide axles for the rollers 152 which are disposed within corresponding openings 158 extending laterally inwardly of the opposite sides 160 and 162 of arm 30 and upwardly from bottom 157 of the arm. The openings 158 and thus rollers 152 are in a staggered arrangement along opposite sides 160 and 162 of radial arm 30. A portion of each roller extends radially outward of the corresponding opening 158, and the rollers engage against the respective inside faces 133 and 135 of the vertical sides 132 and 134, respectively, of cradle 128. The staggered orientation of rollers 152 maintains radial arm 30 in a centered position between sides 132 and 134 of the cradle, and each of the rollers has line contact with the corresponding inside face of the cradle sides, thus to minimize friction and promote ease in displacing arm 30 relative to the cradle in the z direction as the milling assembly moves up and down. The rotation of post 124 and relative displacements between arm 30 and cradle 128 enable the necessary displacements of table 24 in the x and y directions to achieve the milling of an arcuate groove in the workpiece.

Figure 8:
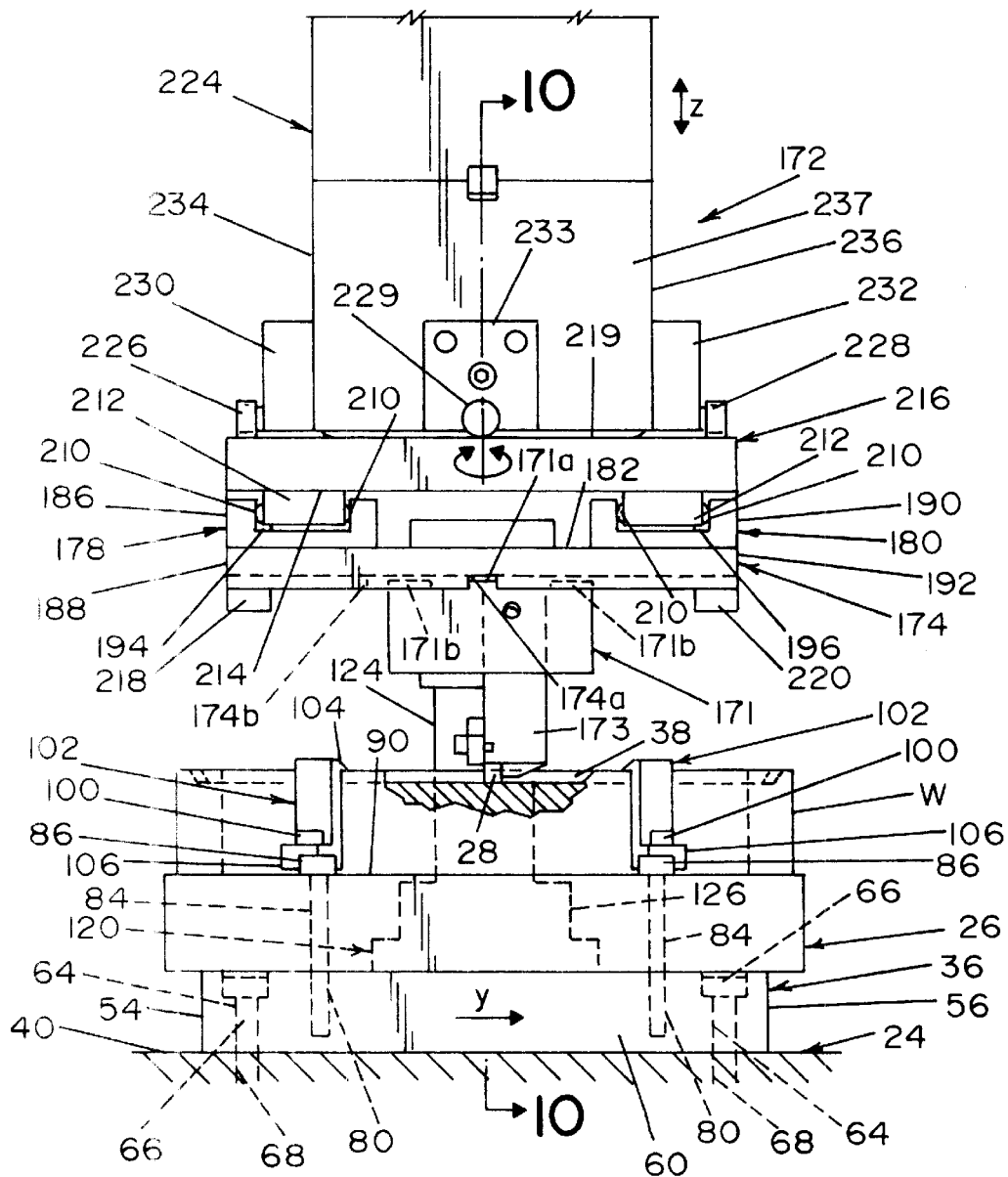
FIG. 8 is an end elevation view of the milling apparatus looking from right to left in FIG. 7.
Figure 9:
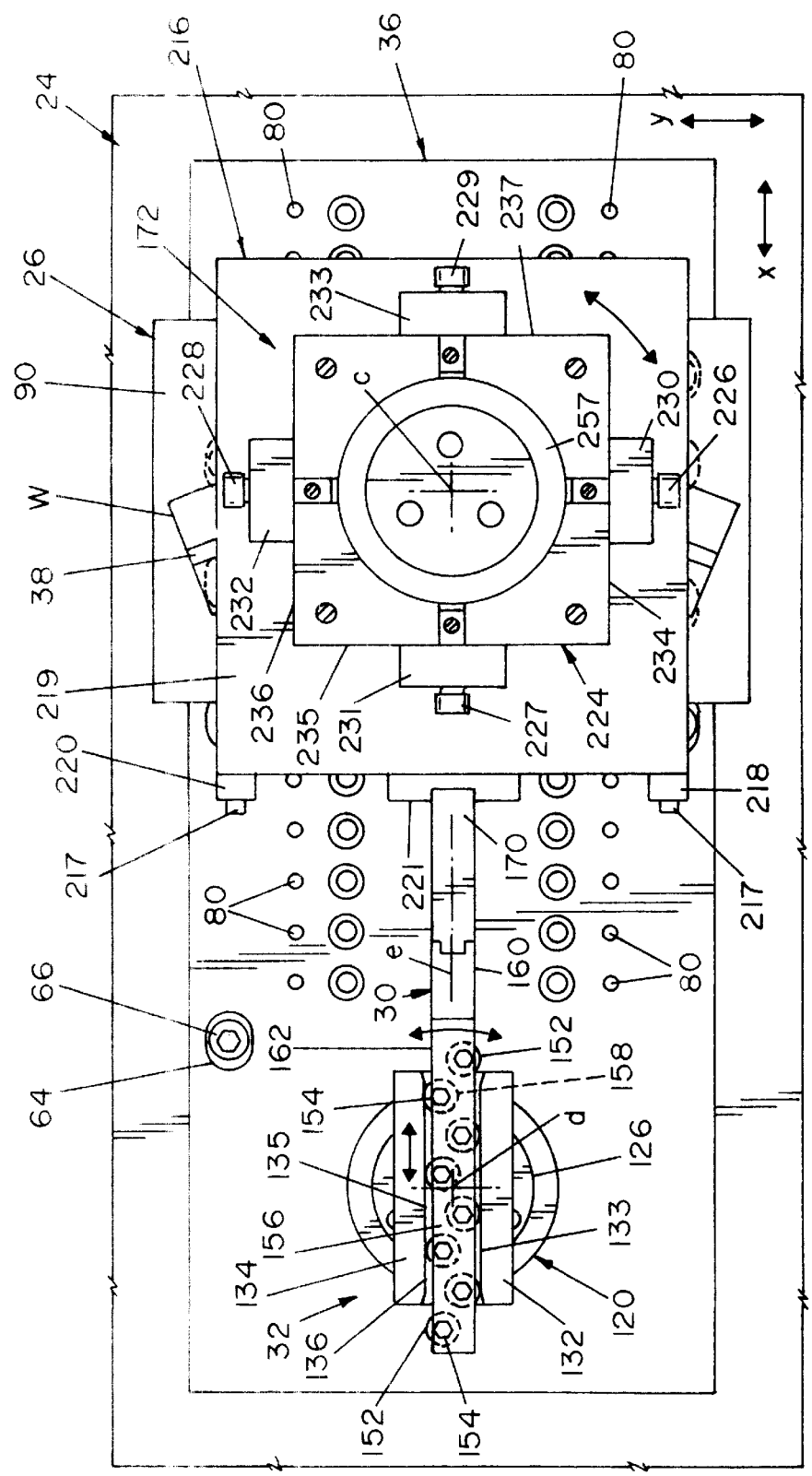
FIG. 9 is a plan view of the milling apparatus.
Figure 10:
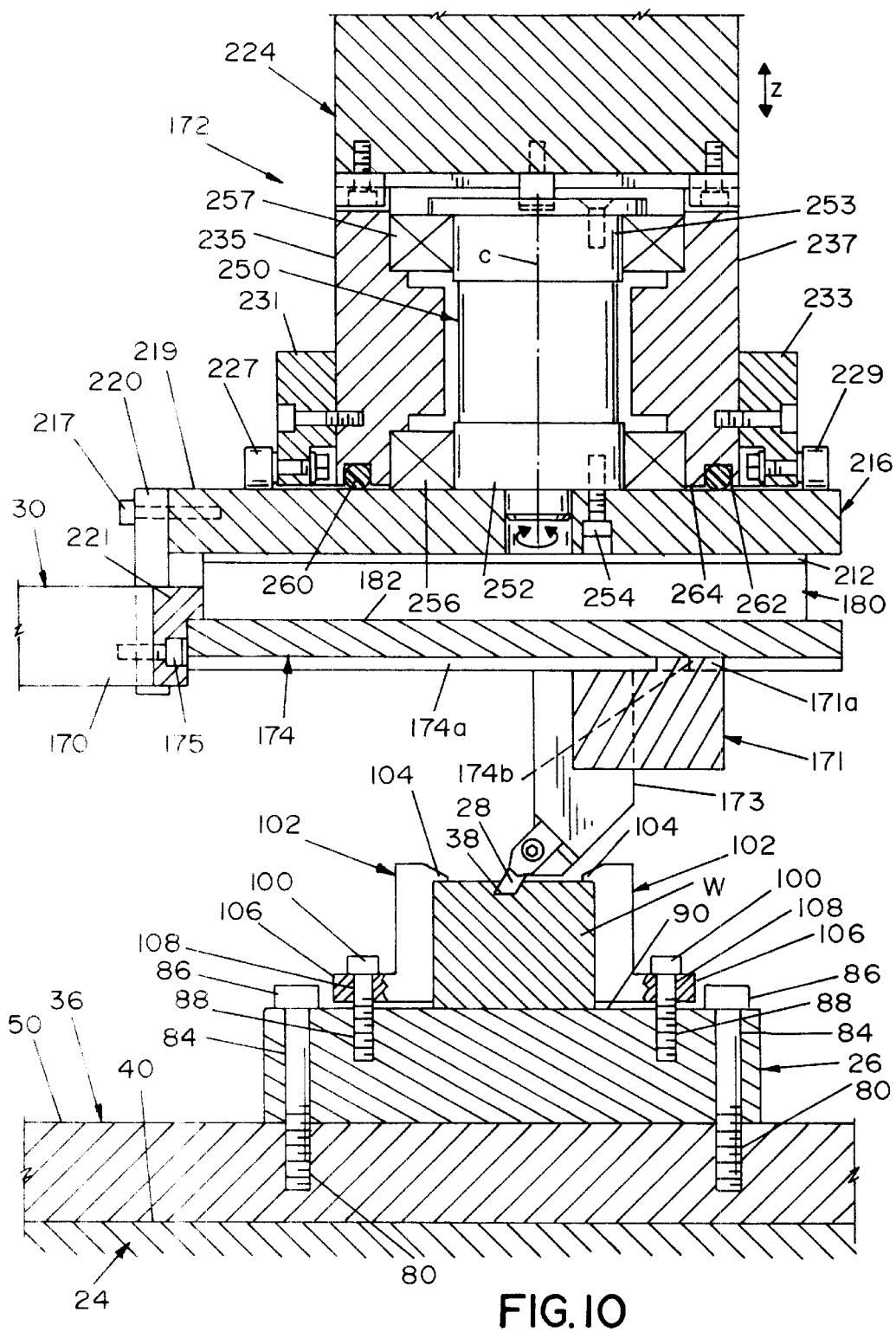
FIG. 10 is an enlarged cross-sectional elevation view looking in the direction of line 10—10 in FIG. 8.
Figure 11:
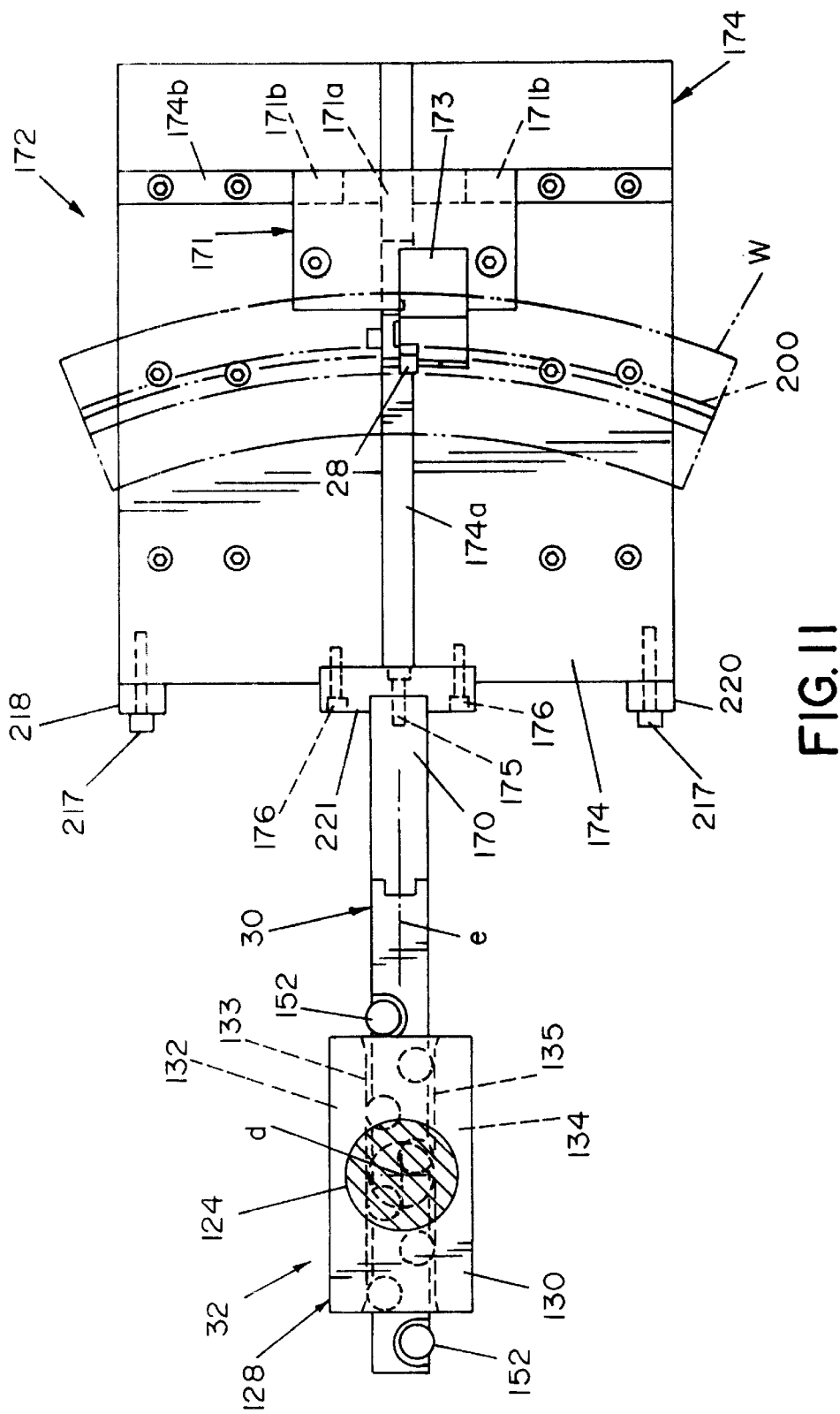
FIG. 11 is an enlarged cross-sectional view looking in the direction of line 11—11 in FIG. 7.

Radial arm 30 at its end 170 distal to post 124 is fixedly attached to a milling assembly 172, which is coaxial with axis c, as best seen in FIGS. 7–11. More particularly in this respect, as best seen in FIG. 11, a mounting block 221 is secured to end 170 of arm 30 by a bolt 175 and to a lower platen 174 of the milling assembly by bolts 176. As shown in FIGS. 7 and 8, lower platen 174 has front and rear horizontally disposed channels 178 and 180 mounted on upper surface 182 of lower platen 174 and extending parallel to the radial arm 30. Front side 186 of the front channel 178 is coplanar with front side 188 of lower platen 174. Similarly, back side 190 of rear channel 180 is coplanar with the back side 192 of lower platen 174. Channels 178 and 180 respectively provide U-shaped raceways 194 and 196 for roller bearing and rail assemblies including roller bearings 210 mounted on rails 212, received in the channels and mounted on the underside 214 of an upper platen 216. In the embodiment shown in FIGS. 6–11, platens 174 and 216 are interconnected to preclude relative displacement therebetween in the direction of channels 178 and 180. In this respect, two vertical stop plates 218 and 220 interconnect the lower and upper platens 174 and 216 and are secured thereto by bolts 217.

The milling assembly includes a milling head 224 on upper surface 219 of upper platen 216. Lower and upper platens 174 and 216 are adapted to rotate about axis c and relative to milling table 24 as the latter moves in the x and y directions during a milling operation. Further, platens 174 and 216 are pivotal about axis c relative to the milling head during a milling operation. More particularly in this respect, as best seen in FIGS. 6–10, milling head 224 includes four rollers 226, 227, 228 and 229 engaging top surface 219 of platen 216. Rollers 226–229 are mounted respectively on roller blocks 230, 231, 232 and 233, which are respectively mounted on sides 234, 235, 236 and 237 of the milling head.

As will be appreciated from FIGS. 9 and 10, rollers 226–229 are adapted to roll on top surface 219 of upper platen 216 about axis c as the platens rotate or pivot about axis c. A spindle 250 having lower and upper ends 252 and 253, respectively, is attached to platen 216 by a plurality of bolts 254, only one of which is visible in FIG. 10. Bearings 256 and 257 respectively circumscribe the lower and upper ends 252 and 253 of spindle 250, allowing platens 174 and 216 to rotate about axis c. A circumferential seal 260 is located in a corresponding groove 262 in a bottom side 264 of milling head 224 and engages upper surface 219 of upper platen 216 to protect the bearings. A driving motor, not shown, is adapted to move milling head 224 up and down, which correspondingly moves platens 174 and 216 and thus arm 30 in the z direction along axis c.

As best seen in FIGS. 7, 8, 10 and 11, cutting tool 28 is secured to the underside of platen 174 in a base mount 171 and by means of a tool holder 173. The base mount has projections 171a and 171b respectively received in tracks 174a and 174b in the underside of platen 174 to maintain cutting tool 28 aligned with radial arm 30 as workpiece W is moved in an x and y direction along radial arc 200. Cutting tool 28 is contoured and angled such that a conical groove 38 is machined as workpiece W moves along the radial arc 200. The width of groove 38 in this embodiment is controlled by the width of cutting tool 28. Drive elements, not shown, move milling assembly 172 up and down in the z axis direction, which controls the depth of groove 38. As mentioned, the vertical movement of milling assembly 172 controls the vertical movement of radial arm 30 interconnected to platen 174. The height of sides 132 and 134 of cradle 128 allows a vertical range of motion for radial arm 30. Cradle 128 supports and guides radial arm 30 and interconnected platens 174 and 216, along with cutting tool 28, as milling table 24 moves axially in the x and y directions. As will be appreciated from FIG. 11, the guidance of radial arm 30 maintains orthogonal alignment of cutting tool 28 with arc 200 as workpiece W is moved along an arcuate path controlled by milling table 24. The axis c of milling assembly 172 and the axis of rotation d of the milling guide 32 are disposed in a common vertical plane e, so that cutting tool 28 can be guided in a positionally correct and simple manner relative to the workpiece W to be machined, so that the movements of the respective cutting tool 28 and workpiece W can be coordinated in a similarly simple manner during the machining.

Figure 16:
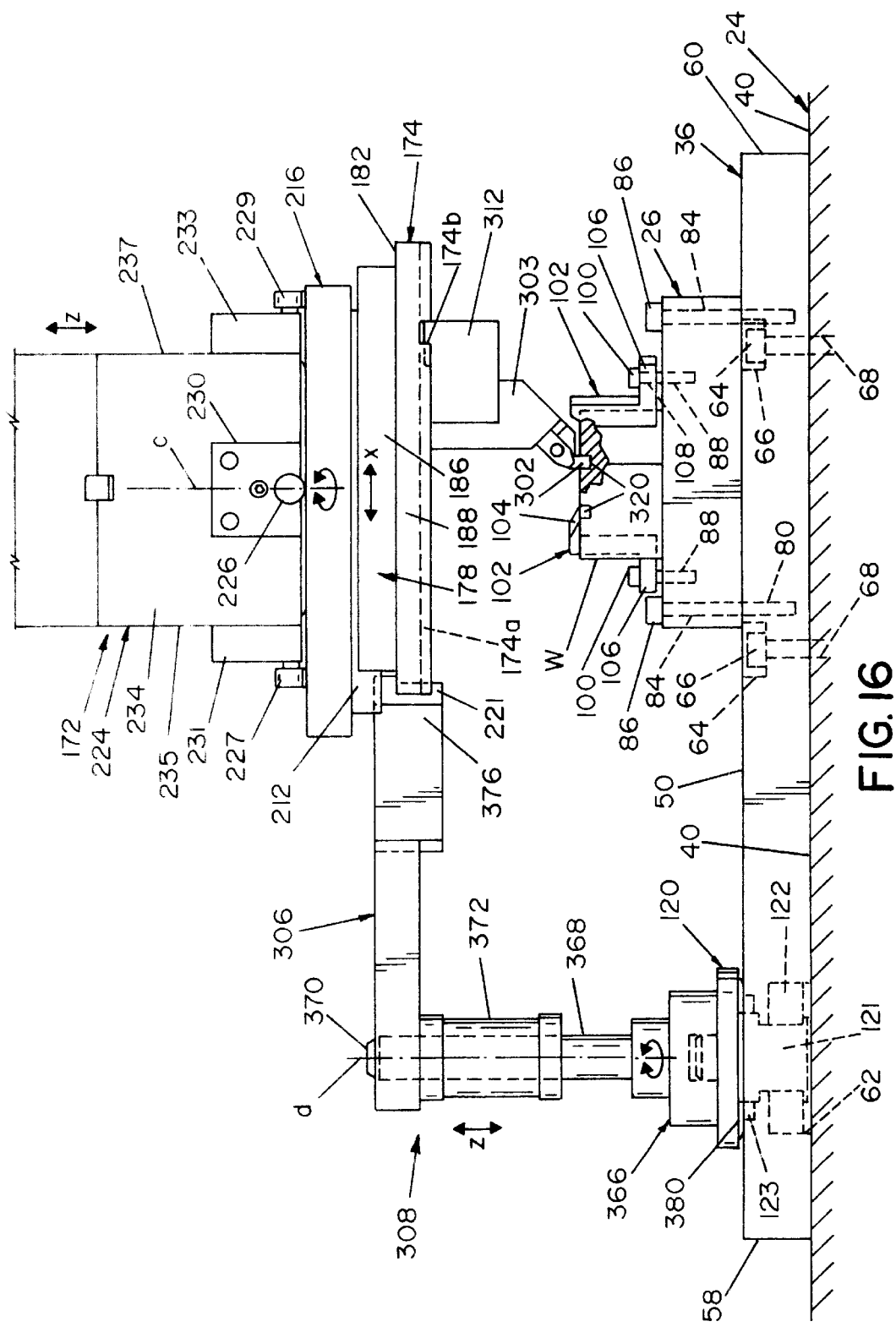
FIG. 16 is an elevation view of the milling apparatus looking from left to right in FIG. 15.
Figure 17:
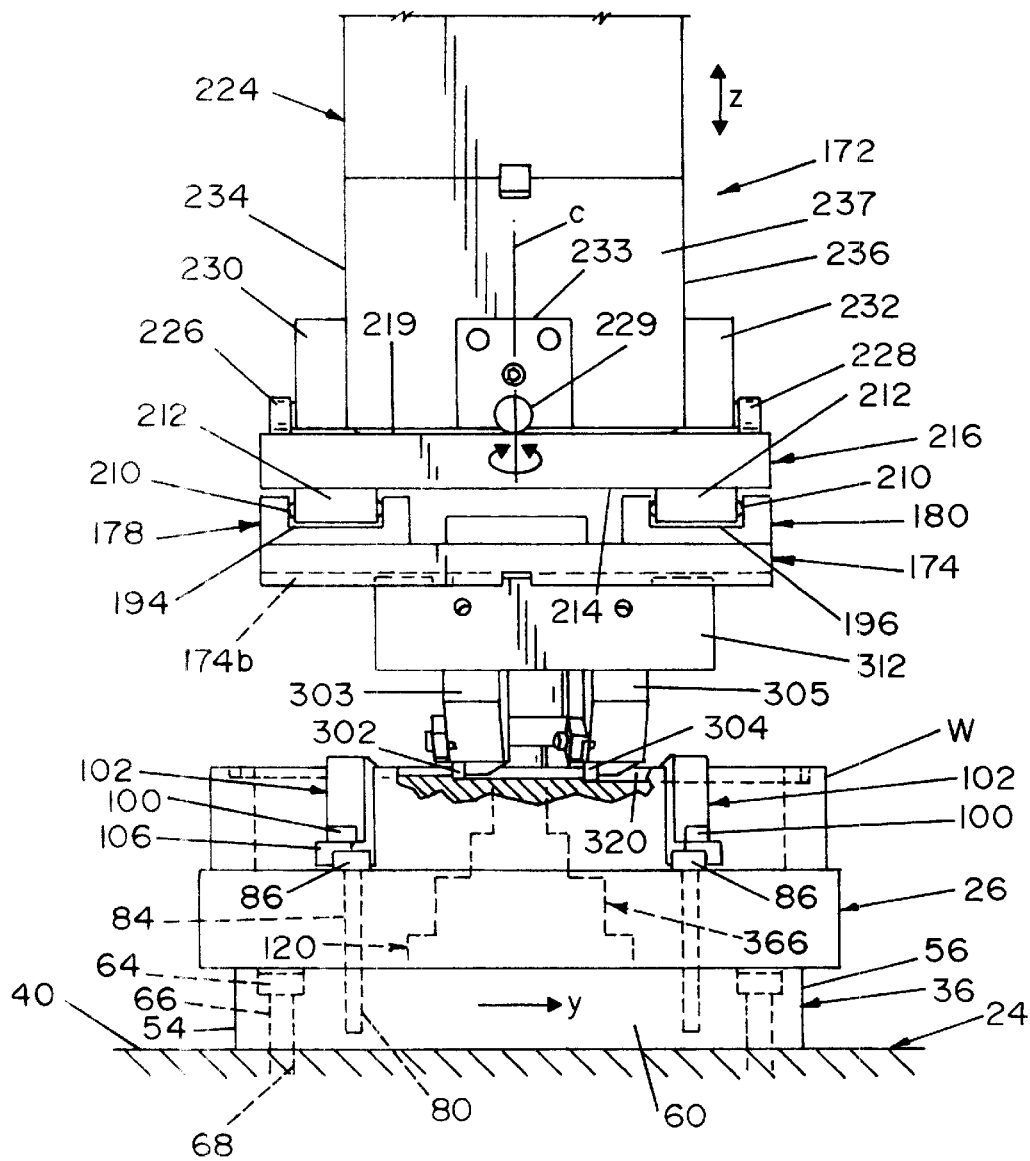
FIG. 17 is an end elevation view of the milling machine looking from right to left in FIG. 16.
Figure 18:
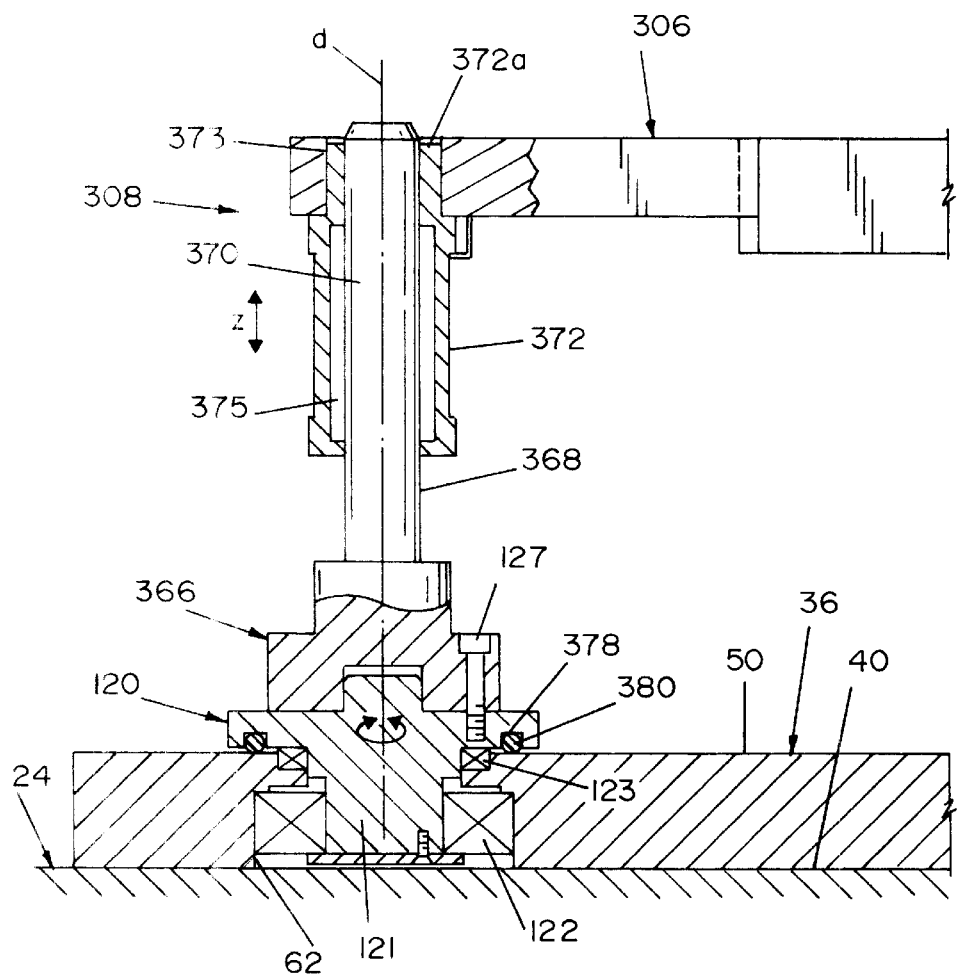
FIG. 18 is an enlarged cross-sectional elevation view of the milling guide taken along line 18—18 in FIG. 15; and, FIG. 19 is an enlarged cross-sectional elevation view of the milling apparatus taken along line 19—19 in FIG. 15.
Figure 19:
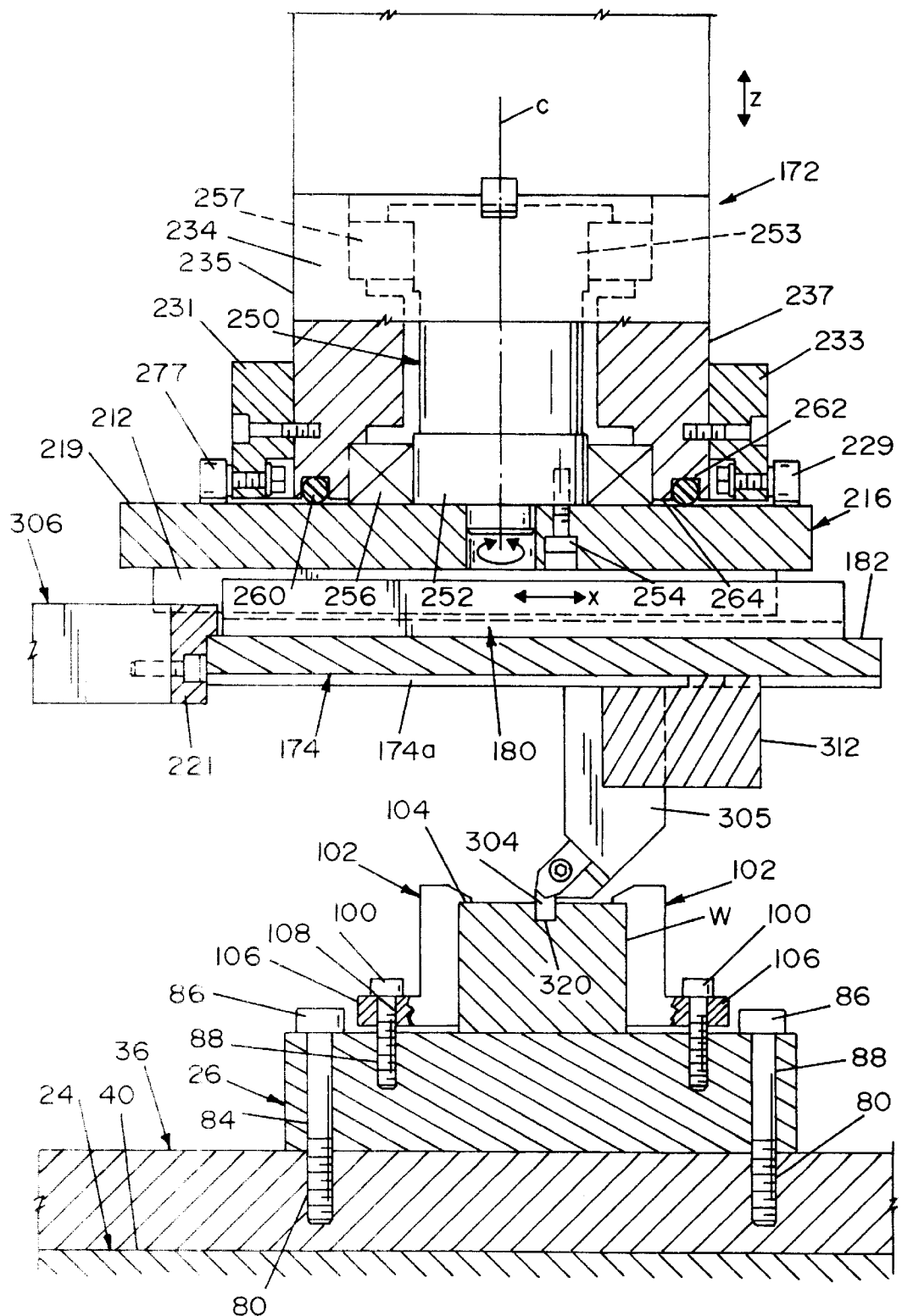

FIGS. 12–19 illustrate another embodiment of the invention, the details of which will be more fully described hereinafter. In this embodiment, like numerals are used to designate component parts of the apparatus corresponding to parts described in the embodiment of FIGS. 3–11. In part in this respect, the milling apparatus includes carriage 36 mounted on upper surface 40 of milling table 24 as described in connection with the earlier embodiment. As in the first embodiment, carriage 36 is generally rectangular and includes collar 120 on upper surface 50 of the carriage proximal to left side 58 thereof. Collar 120 includes a shaft portion 121 depending therefrom into opening 62 in the carriage, and bearings 122 and 123 surround shaft portion 121 and support collar 120 and thus milling guide 308 for rotation about axis d. Collar 120 further includes a circumferential groove 378 which supports a seal 380 which rests upon upper surface 50 of carriage 36. As seen in FIG. 16, carriage 36 includes a series of mounting holes 64 therethrough. Carriage 36 is attached to table 24 by a series of bolts 66 that extend through mounting holes 64 in carriage 36 and into corresponding threaded openings 68 in top surface 40 of milling table 24. Accordingly, the carriage moves in conjunction with the movements of milling table 24. Carriage 36 also includes two rows of linearly arranged locating and/or clamping holes 80 which are internally threaded and extend into upper surface 50 of carriage 36 starting a few inches from collar 120 and extending outward to a location near a right side 60 of carriage 36.

Figure 12:
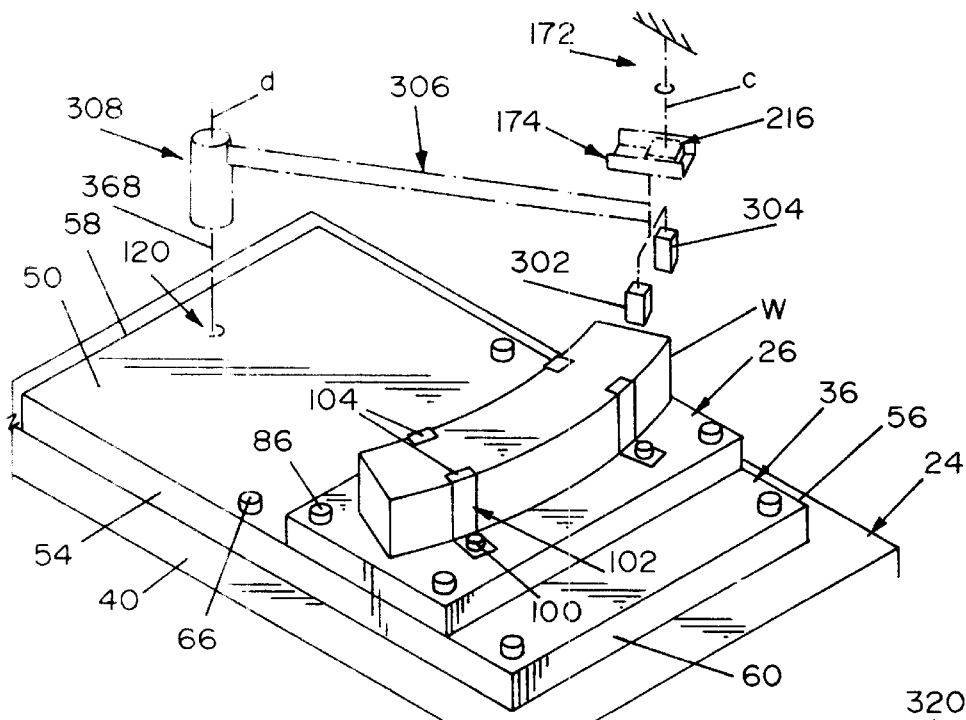
FIG. 12 is a pictorial diagram of another embodiment of a milling apparatus in accordance with the invention.
Figure 14:
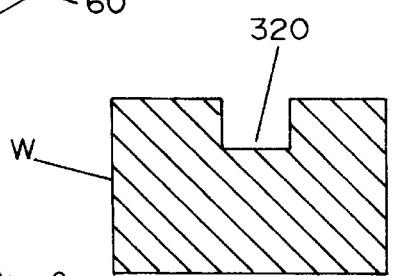
FIG. 14 is an enlarged cross-sectional elevation view of the workpiece in FIG. 13 and showing a straight-sided groove machined in the workpiece.
Figure 13:
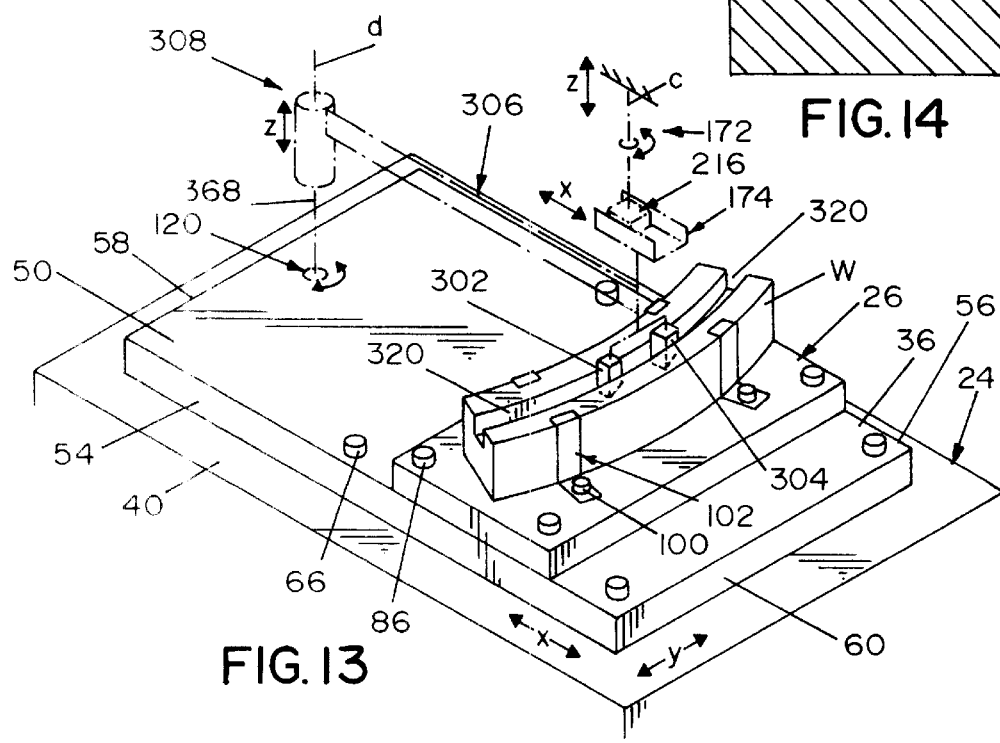
FIG. 13 is a pictorial diagram of the milling apparatus shown in FIG. 12 and illustrating multiple tools engaged with the workpiece to provide a groove therein.
Figure 15:
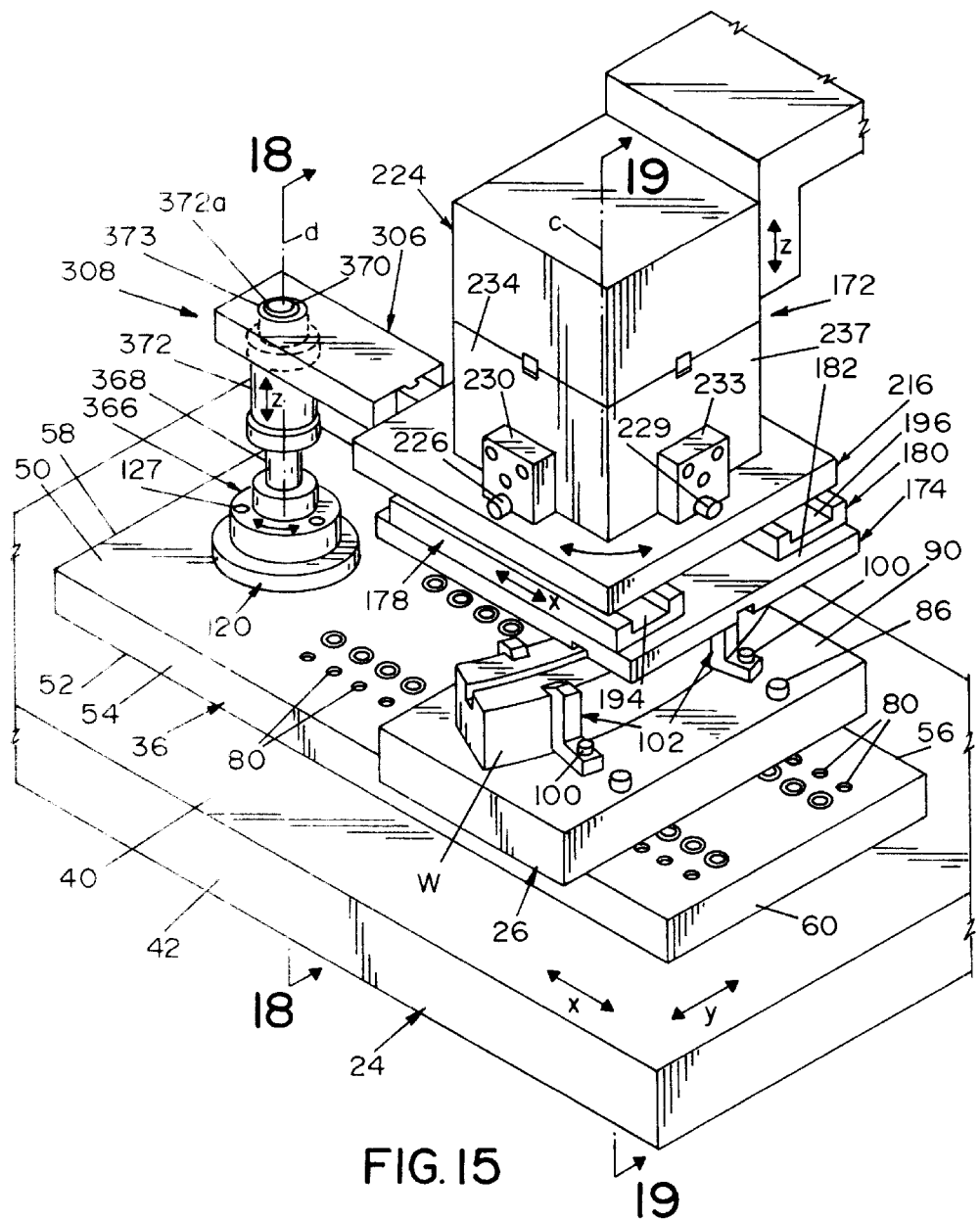
FIG. 15 is a perspective view of the milling apparatus shown in FIG. 12.

As schematically shown in FIGS. 12–14, a single arcuate, workpiece segment W is mounted on milling table 24 by a workpiece holding fixture 26. In this embodiment, milling table 24 is movable along the x and y axes in a horizontal plane, as with the earlier embodiment. Multiple cutting tools 302 and 304 are connected to a milling assembly 172, as described hereinafter, and the milling assembly is connected to a radial arm 306 which guides the milling assembly in a radial motion. A milling guide 308 is pivotally attached to carriage 36 and is rotatable about axis d. As such, radial arm 306 maintains an orthogonal relationship to cutting tools 302 and 304, and the latter are straight sided for cutting a straight-sided groove 320 in the workpiece, as shown in FIG. 14. Tools 302 and 304 are of the same width as the width of groove 320, and tool 304 engages the workpiece below the point of engagement of tool 302 therewith, whereby the tools, in tandem, cut a deeper portion of the groove on each pass than would be cut by a single tool.

FIGS. 15–19 show the structural relationships between radial arm 306, milling table 24, and milling assembly 172, which enable the relative displacement thereof necessary to machine groove 320 in workpiece W. In this respect, milling assembly 172 is movable by drive elements, not shown, up and down in the z direction along axis c and orthogonal to the x and y directions. Again, it will be appreciated that milling table 24 is connected to a machine base, not shown, which includes a series of lead screws, motors, and belts, as is common in the industry, for coordinating the movements of milling table 24 in the x and y directions.

In this embodiment, a post 368 is affixed to collar 120 for rotation therewith by a stepped flange 366 and a plurality of bolts 127 extending through the flange and into threaded bores provided therefor in collar 120. Upper end 370 of post 368 extends through a sleeve 372 which has its upper end 372a secured in an opening 373 in radial arm 306. A bearing 375 is interposed between sleeve 372 and post 368, whereby it will be appreciated that arm 306 is both pivotal and axially displaceable relative to post 368, and that the post is pivotal about axis d relative to carriage 36. Opposite end 376 of radial arm 306, distal to pin 368, is connected to lower platen 174 of the milling assembly in a manner similar to that described above and through the use of a mounting block 221. In this embodiment, vertical plates 218 and 220 connecting platens 174 and 216 are removed, whereby upper platen 216 is slidably movable in the x axis direction relative to lower platen 174 and arm 306 along the two horizontally disposed channels 178 and 180 mounted on the upper surface of platen 174. Further in this respect, and as described herein, bottom side 214 of upper platen 216 includes rails 212 carrying roller bearings 210 and which rails are received in channels 178 and 180 whereby, without plates 218 and 220, the platens are relatively displaceable in the x axis direction. Bearings 210 are, for example, linear bearings, which are supported and retained in channels 178 and 180 in a manner whereby the platens and the milling assembly are movable as a unit up and down in the z axis direction. Cutting tools 302 and 304 are mounted in tool holders 303 and 305, respectively, of a base unit 312 which is mounted on the underside of platen 174. The cutting tools cut a straight sided groove, as shown in FIG. 14, in a workpiece W in response to controlled displacement of table 24 in the x and y directions to achieve arcuate displacement of workpiece W relative to the cutting tools, and progressive downward displacement of milling assembly 172 in the z direction produces a desired groove depth.

While considerable emphasis has been placed herein on the preferred embodiments of the invention, it will be appreciated that other embodiments can be made and that many changes can be made on the preferred embodiments without departing from the principles of the invention. Accordingly, it is to be distinctly understood that the foregoing descriptive matter is to be interpreted merely as illustrative of the invention and not as a limitation.

Having thus described the invention, it is claimed:

1. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being independently supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece.

2. An apparatus according to claim 1, wherein said arm is axially displaceable in said x direction relative to said post.

3. An apparatus according to claim 1, wherein said post is pivotal about said post axis, a cradle mounted on said post for displacement therewith, and said arm being axially displaceable in said x direction in said cradle.

4. An apparatus according to claim 3, wherein said arm is radially displaceable within said cradle relative to said post.

5. An apparatus according to claim 3, wherein said arm is vertically displaceable within said cradle relative to said post.

6. An apparatus according to claim 5, wherein said arm is radially displaceable within said cradle relative to said post.

7. An apparatus according to claim 3, wherein said cradle includes a bottom support having an opening in the underside thereof.

8. An apparatus according to claim 7, wherein said opening rotatably receives said post.

9. An apparatus according to claim 1, wherein a workpiece mounted on said carriage and said post axis are radially spaced apart and said table is radially displaceable relative to said cutting tool for varying the radial distance between said post axis and a workpiece mounted on said carriage during the machining of a groove in the workpiece.

10. An apparatus according to claim 9, wherein said radial distance decreases for successive displacements of the workpiece along said arcuate path relative to said cutting tool during the machining of a groove in the workpiece.

11. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said post is pivotal about said post axis, a cradle mounted on said post for displacement therewith, and said arm being supported in said cradle, said cradle includes a bottom support having an opening in the underside thereof, said cradle includes a pair of vertical sides spaced apart to form an opening therebetween.

12. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said post is pivotal about said post axis, a cradle mounted on said post for displacement therewith, and said arm being supported in said cradle, said cradle includes a bottom support having an opening in the underside thereof, said cradle includes a pair of vertical sides spaced apart to form an opening therebetween, said arm includes an end in said cradle, and aplurality of rollers mounted on said end.

13. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said post is pivotal about said post axis, a cradle mounted on said post for displacement therewith, and said arm being supported in said cradle, said cradle includes a bottom support having an opening in the underside thereof, said cradle includes a pair of vertical sides spaced apart to form an opening therebetween, said arm includes an end in said cradle, and a plurality of rollers mounted on said end, said arm is radially and axially displaceable within said opening of said cradle relative to said post.

14. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said post is pivotal about said post axis, a cradle mounted on said post for displacement therewith, and said arm being supported in said cradle, said cradle includes a bottom support having an opening in the underside thereof, said cradle includes a pair of vertical sides spaced apart to form an opening therebetween, said arm includes an end in said cradle, and a plurality of rollers mounted on said end, said arm is radially and axially displaceable within said opening of said cradle relative to said post, said milling assembly includes a lower platen attached to said arm and an upper platen mounted on said lower platen.

15. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said post is pivotal about said post axis, a cradle mounted on said post for displacement therewith, and said arm being supported in said cradle, said cradle includes a bottom support having an opening in the underside thereof, said cradle includes a pair of vertical sides spaced apart to form an opening therebetween, said arm includes an end in said cradle, and a plurality of rollers mounted on said end, said arm is radially and axially displaceable within said opening of said cradle relative to said post, said milling assembly includes a lower platen attached to said arm and an upper platen mounted on said lower platen, said upper platen is pivotal about said second axis.

16. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said post is pivotal about said post axis, a cradle mounted on said post for displacement therewith, and said arm being supported in said cradle, said cradle includes a bottom support having an opening in the underside thereof, said cradle includes a pair of vertical sides spaced apart to form an opening therebetween, said arm includes an end in said cradle, and a plurality of rollers mounted on said end, said arm is radially and axially displaceable within said opening of said cradle relative to said post, said milling assembly includes a lower platen attached to said arm and an upper platen mounted on said lower platen, said upper platen is pivotal about said second axis, a workpiece mounted on said carriage and said post axis are radially spaced apart and said table is radially displaceable relative to said cutting tool for varying the radial distance between said post axis and a workpiece mounted on said carriage during the machining of a groove in the workpiece.

17. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said post is pivotal about said post axis, a cradle mounted on said post for displacement therewith, and said arm being supported in said cradle, said cradle includes a bottom support having an opening in the underside thereof, said cradle includes a pair of vertical sides spaced apart to form an opening therebetween, said arm includes an end in said cradle, and a plurality of rollers mounted on said end, said arm is radially and axially displaceable within said opening of said cradle relative to said post, said milling assembly includes a lower platen attached to said arm and an upper platen mounted on said lower platen, said upper platen is pivotal about said second axis, a workpiece mounted on said carriage and said post axis are radially spaced apart and said table is radially displaceable relative to said cutting tool for varying the radial distance between said post axis and a workpiece mounted on said carriage during the machining of a groove in the workpiece, said radial distance decreases for successive displacements of the workpiece along said arcuate path relative to said cutting tool.

18. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said milling assembly includes a lower platen attached to said arm and an upper platen mounted on said lower platen.

19. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a cutting tool overlying a workpiece mounted on said carriage, said table being movable in x and y directions in a first horizontal plane to displace the workpiece along an arcuate path relative to said cutting tool, and said milling assembly being vertically displaceable along said second axis to move said cutting tool toward and away from said workpiece, said milling assembly includes a lower platen attached to said arm and an upper platen mounted on said lower platen, said upper platen is pivotal about said second axis.

20. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported from above proximal to said second axis, said milling assembly in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece.

21. An apparatus according to claim 20, wherein said arm is radially fixed and axially displaceable in said x direction relative to said post.

22. An apparatus according to claim 20, wherein said arm is attached to a sleeve rotatably received on said post.

23. An apparatus according to claim 22, wherein said sleeve is vertically displaceable relative to said post.

24. An apparatus according to claim 20, wherein said means for mounting a workpiece on said carriage is radially adjustable relative said post axis for varying the radial distance between a workpiece mounted on the carriage and said cutting tools.

25. An apparatus according to claim 23, wherein said radial distance is fixed for successive displacements of said workpiece along said arcuate path relative to said cutting tool.

26. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said milling assembly includes relatively displaceable lower and upper platens, said lower platen being attached to said arm, said lower platen includes a pair of channels mounted thereon and said upper platen includes a rail slidably received in each channel, said rails carry roller bearings engaging said channels, said upper and lower platens are slidable relative to one another radially of said post axis.

27. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said milling assembly includes relatively displaceable lower and upper platens, said lower platen being attached to said arm, said lower platen includes a pair of channels mounted thereon and said upper platen includes a rail slidably received in each channel, said rails carry roller bearings engaging said channels, said upper and lower platens are slidable relative to one another radially of said post axis, said lower platen and said upper platen are pivotal about said second axis.

28. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, the trailing one of said cutting tools with regard to said arcuate path is vertically lower than the leading cutting tool.

29. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said arm is radially fixed and axially displaceable relative to said post, said milling assembly includes relatively displaceable lower and upper platens, said lower platen being attached to said arm.

30. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said arm is radially fixed and axially displaceable relative to said post, said milling assembly includes relatively displaceable lower and upper platens, said lower platen being attached to said arm, said lower platen includes a pair of channels mounted thereon and said upper platen includes a rail slidably received in each channel.

31. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said arm is radially fixed and axially displaceable relative to said post, said milling assembly includes relatively displaceable lower and upper platens, said lower platen being attached to said arm, said lower platen includes a pair of channels mounted thereon and said upper platen includes a rail slidably received in each channel, said rails carry roller bearings engaging said channels.

32. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said arm is radially fixed and axially displaceable relative to said post, said milling assembly includes relatively displaceable lower and upper platens, said lower platen being attached to said arm, said lower platen includes a pair of channels mounted thereon and said upper platen includes a rail slidably received in each channel, said rails carry roller bearings engaging said channels, said upper and lower platens are slidable relative to one another radially of said post axis.

33. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said arm is radially fixed and axially displaceable relative to said post, said milling assembly includes relatively displaceable lower and upper platens, said lower platen being attached to said arm, said lower platen includes a pair of channels mounted thereon and said upper platen includes a rail slidably received in each channel, said rails carry roller bearings engaging said channels, said upper and lower platens are slidable relative to one another radially of said post axis, said lower platen and said upper platen are pivotal about said second axis.

34. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said milling assembly includes relatively displaceable lower and upper platens, said lower platen being attached to said arm.

35. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said milling assembly includes relatively displaceable lower and upper platens, said lower platen being attached to said arm, said lower platen includes a pair of channels mounted thereon and said upper platen includes a rail slidably received in each channel.

36. Apparatus for machining a groove in an arcuate workpiece segment comprising, a horizontal milling table, a carriage mounted on said table, means for mounting a workpiece on said carriage, a milling guide mounted on said carriage and including a vertical post having a post axis and an arm extending radially from said post and being pivotal about said post axis, a milling assembly attached to said arm at a location spaced from said post, said milling assembly having a second axis parallel to said post axis and being supported in suspension above said milling table, said milling assembly including a pair of cutting tools overlying a workpiece mounted on said carriage, said table being movable in x and y directions in a first horizontal plane to displace the workpiece along an arcuate path relative to said cutting tools, said cutting tools being in tandem relative to said arcuate path, and said milling assembly being vertically displaceable along said second axis to move said cutting tools toward and away from said workpiece, said milling assembly includes relatively displaceable lower and upper platens, said lower platen being attached to said arm, said lower platen includes a pair of channels mounted thereon and said upper platen includes a rail slidably received in each channel, said rails carry roller bearings engaging said channels.

* * * * *